US008020931B2

(12) United States Patent
Frady (10) Patent No.: US 8,020,931 B2
(45) Date of Patent: Sep. 20, 2011

(54) SEAT CUSHION AND METHOD OF USE THEREOF (76) Inventor: George L. Frady, Canton, GA (US)

( * ) Notice: Subject to any disclaimer, the term of this patent is extended or adjusted under 35 U.S.C. 154(b) by 5 days.

(21) Appl. No.: 11/972,799

(22) Filed: Jan. 11, 2008

(65) Prior Publication Data
US 2009/0179478 A1 Jul. 16, 2009

(51) Int. Cl.
A47C 31/00 (2006.01)
(52) U.S. Cl. .................................. 297/219.1; 297/485
(58) Field of Classification Search ............... 297/219.1, 297/224, 229, 228.12, 485; 5/621, 628; 224/155, 224/156
See application file for complete search history.

(56) References Cited

U.S. PATENT DOCUMENTS

| 1,955,040 | A | * | 4/1934 | Wittcoff | 297/219.1 |
| 2,807,314 | A | * | 9/1957 | Larkin | 297/229 |
| 2,817,391 | A | * | 12/1957 | Zacks | 297/229 |
| 5,596,781 | A | * | 1/1997 | Graebe | 5/710 |
| 5,611,098 | A | * | 3/1997 | Skibik | 5/653 |
| 5,641,199 | A | * | 6/1997 | Bond-Madsen | 297/229 |
| 5,927,575 | A | * | 7/1999 | Gatling | 224/153 |
| 6,007,572 | A | * | 12/1999 | Baldwin | 607/114 |
| 6,536,791 | B1 | * | 3/2003 | Adams | 280/250.1 |
| 6,848,746 | B2 | * | 2/2005 | Gentry | 297/380 |
| 6,929,325 | B1 | * | 8/2005 | Goelo | 297/219.1 |
| 2004/0155499 | A1 | * | 8/2004 | Chambers et al. | 297/228.1 |
| 2007/0187444 | A1 | * | 8/2007 | Hajari | 224/155 |

* cited by examiner

Primary Examiner — Sarah B McPartlin (57) ABSTRACT

A seat cushion having a seat pad with a channel therein, the channel having a web with apertures for drainage of water away from the seat pad. The web provides a channel area on top of the web and a channel area below the web for egress of water. In one embodiment, the seat cushion is secured to a tree stand frame by straps and has a dual-section back portion that secures to a tree via a fastener at the top thereof. The dual-section back portion folds together to form a single planar construct and also folds to the seat pad portion, again to form a single planar package of collapsed 'Z' shape for transport or storage. In an alternate embodiment, the seat cushion, optionally with or without a back portion, is secured to a boat seat.

20 Claims, 5 Drawing Sheets

SEAT CUSHION AND METHOD OF USE THEREOF

CROSS-REFERENCE TO RELATED APPLICATIONS

None

FEDERALLY SPONSORED RESEARCH OR DEVELOPMENT

None

PARTIES TO A JOINT RESEARCH AGREEMENT

None

REFERENCE TO A SEQUENCE LISTING

None

BACKGROUND OF THE INVENTION

1. Technical Field of the Invention

The present invention relates generally to seat cushioning devices, and more specifically to a cushion having a water drainage mechanism for attachment to a hunter's tree stand seat or boat seat.

2. Description of Related Art

Hunters often await their prey while observing from a perch at an elevated location, such as a tree stand secured to a tree. Such tree stands typically have a flat platform upon which the hunter can stand or sit. Often a hunter will have to wait a long period of time before prey approaches and comfort is of great importance. Accordingly, many hunters equip their tree stand seat with a cushion to provide a comfortable position in which to wait.

In addition to needing the seat area to be cushioned, the hunter will often lean back against the tree bark. Such irregular and hard surface does not provide adequate comfort for most hunters. Accordingly, it is desirable to have some form of padding that is disposed against the tree bark, wherein the padding provides a comfortable surface for a resting hunter.

Unfortunately, inclement weather, such as rain or snow, can occur while the hunter is waiting in the tree stand. In such cases, simple cushions under compression from the hunter's weight tend to form an indentation or 'dish' shape, wherein water from rain or melting snow will accumulate in the indentation. Such pooling of water is very uncomfortable for a person sitting in it, can cause damage to a person's skin, and can lead to unsanitary conditions over time. Further, when a padded back is provided for the comfort of a hunter, such may channel water directly to the seat cushion area, adding to the discomfort.

Additionally, tree stands are located in remote areas and any equipment needed therefor must be transported by the hunter. Further, it is desirable that such equipment be easily stowed when not in use. Thus, it is desirable that any such tree stand cushion be light and have a compact profile.

In addition to tree stand seats, other seating devices come into contact with water. In particular, boat seats are subject to spray or rain. Most cushioning devices for boat seats lack a mechanism for removal of the water spray which then pools on the cushion leading to discomfort for the user thereof.

Therefore, it is readily apparent that there is a need for a seat cushion that prevents the accumulation of water, and which is readily transportable and stowable in a confined space.

BRIEF SUMMARY OF THE INVENTION

Briefly described, in a preferred embodiment, the present invention overcomes the above-mentioned disadvantages and meets the recognized need for such a device by providing a seat cushion for a tree stand or boat seat, the cushion having a seat pad portion with a channel therein, wherein the channel has a web with apertures for drainage. The web is at approximately mid-height of the seat pad, thereby providing a channel area on top of the web and a channel area below the web. The seat cushion may comprise a cushion portion alone, or may optionally comprise a back portion. The back portion comprises an upper and lower section that are positionable as desired, although the back portion could alternately comprises a single section. The seat cushion is secured to a tree stand frame by straps, wherein the dual-section back portion is secured to a tree by a bungee or similar strap at the top thereof. The dual-section back portion of the tree stand cushion folds together to form a single planar construct and also folds to the seat pad portion, again to form a single planar construct of 'Z' shape.

During inclement weather, water that would otherwise accumulate to the discomfort of a hunter utilizing the tree stand travels to the channel onto the web and passes through the apertures and away from the hunter, preventing an uncomfortable accumulation of water. Water also passes on the web either to the front or the rear of the hunter.

The tree stand cushion of the present invention could also be made in a dual version to accommodate two hunters, wherein each hunter is seated on a seat pad with a channel, web and aperture, and wherein the two seat pads are joined together by a third channel with web and apertures, or by a fastener.

The boat seat cushion embodiment is similar to the tree stand cushion in having the seat pad portion with a channel therein, but optionally does not require the back portion.

According to its major aspects and broadly stated, the present invention in its preferred form is a cushion for a tree stand or boat seat having a pad with a left member, a right member and a channel, with a web disposed therewithin, disposed between the left member and the right member, and a rear member, wherein the left member and the right member extend perpendicular to, and in the same plane as, the rear member. The web further has at least one aperture disposed therethrough.

The seat cushion may optionally comprise a rear section and a flexible joint hingedly attached the rear member to the rear section. The rear section has a lower back portion, an upper back portion and a hinge disposed therebetween.

The seat cushion has three securing straps, an inner strap, a middle strap and an outer strap. The middle strap is less restrained than the other two straps to permits deformation of the left and right members under weight. In an alternate embodiment, the seat cushion could optionally have only two straps, inner and outer.

The tree stand cushion has a fastening member, such as, for exemplary purposes only, a bungee or similar cord or strap with hook ends or buckle fastener, at the top of the upper back portion to secure the strap to or around a tree.

The upper back portion and the lower back portion fold coplanar with the left member, the right member and the rear member to form a compact package.

In an alternate embodiment, the tree stand cushion has a second pad comprising a second left member, a second right member and a second channel therebetween, and a second web disposed within the second channel, the second web having at least one aperture therethrough. The alternate embodiment further comprises a third web with at least one aperture therethrough, the web disposed in a third channel between and coplanar with the pad and the second pad. The webs constrain the dimension of the channels to a maximum width.

The tree stand cushion is utilized by placing it on a tree stand frame and securing it to the tree stand frame via straps and, optionally where the cushion has a back portion, to a tree via a fastener.

The apertures in the web permit water that has drained into the channel to exit the tree stand cushion, thereby adding to the comfort of the hunter utilizing the present invention.

In an alternate embodiment suitable for use with boat seats, the seat cushion comprises a seat pad portion with drainage channel therein, wherein the drainage channel has apertures therethrough for water to pass. The cushion can be secured to a boat seat via hook-and-loop fasteners that secure around mounting rods of the boat seat.

More specifically, the present invention is a tree stand cushion having a pad, a flexible joint, a lower back portion and an upper back portion. The lower back portion is attached to the pad via a flexible joint. Fillets are disposed at the edge of and between the pad and lower back portion to provide additional security and longevity to the flexible joint. The pad may be generally round, rectangular, triangular and/or generally trapezoidal.

The top of the upper back portion has a hole therethrough to accept a bungee cord to facilitate fastening to a tree by passage of the bungee around the tree, wherein the bungee is secured by connecting hook ends, thereby retaining the top, and consequently, the tree stand cushion, against the tree.

The lower back portion and the upper back portion are joined by a hinge that permits folding the lower back portion to the upper back portion at any angle. The lower back portion and the upper back portion are foldable into a single planar configuration when so selected.

The pad has a rear portion and left and right extensions, all three in the same plane, and the left and right extensions are separated by a channel disposed therebetween. A web extends between the left and right extension to constrain the channel to a maximum width. The web has apertures that pass through it to permit the drainage of dew, snow or rain water that would otherwise accumulate on the web to the discomfort of the user.

A plurality of straps beneath the pad provide for securing the tree stand cushion to a tree stand frame or seat. Stitching of the cross straps and the straps secure same to the pad and along with the web further restrain the channel to a maximum separation width. The stitching of the centermost strap is farther from the channel than the stitching for the remaining straps to provide additional 'give' to the pad when the user applies his/her weight thereto during taking of a seated position.

The tree stand cushion is made from fabric covering a cushioning material, such as, for exemplary purposes only, foam rubber. The fabric material is preferably waterproof and scent proof.

In use, the tree stand cushion is transported to a tree stand and placed thereupon, or alternately may be transported attached to the tree stand, wherein the tree stand is secured to a tree with the tree stand cushion pre-installed. The straps are passed below the seat of the tree stand and secured via the buckles. The lower back portion and the upper back portion are placed against the tree and the bungee is passed around the tree and secured to itself via its hooks.

A hunter subsequently takes a seated position on the tree stand cushion and awaits his game. In the event of inclement weather, such as rain, water is collected within the channel and dispensed away from the hunter, passing through the apertures into a lower portion of the channel. The water then passes forward or rearward off of the tree stand, increasing the comfort of the hunter by minimizing and/or eliminating pooling of water around and under the hunter.

When use is concluded, the tree stand cushion may be removed from the tree stand and folded for storage, or alternately the tree stand with cushion intact can be transported to a selected location. The upper back portion is folded flat against the lower back portion via the hinge for form a single plane, and the combined upper and lower back portions are subsequently folded flat against the pad via the flexible joint to form a single planar package. In its folded condition, the pad, the lower back portion and the upper back portion form a compact 'Z' shape.

Once the pad, the lower back portion and the upper back portion are folded into a coplanar form, the bungee is secured therearound via its hooks to form a readily transportable and/or storable package.

In an alternate embodiment, the dual tree stand seat cushion has a seat pad similar to the preferred embodiment, but with the addition of a second rear portion, a second right extension and a second left extension to provide seating for a second hunter. The second right extension and the second left extension are separated by a second channel with a web therewithin. The web has apertures that permit the passage of water as for the preferred embodiment described hereinabove.

The dual tree stand seat cushion of the alternate embodiment has a unitary lower back section, hinge and upper back section that extend across the original pad of the preferred embodiment and the second seat pad added by the alternate embodiment. The upper back section of the alternate embodiment has a top with a bungee passing through the top via a throughhole to secure the dual tree stand cushion to a tree. In an alternated embodiment, the tree stand cushion could comprise hook-and-loop fasteners, in lieu of straps and bungee cord, to secure the tree stand cushion to a tripod frame, or to secure the back portion, if applicable, to the back frame of a seat.

The lower back section is hingedly joined to the seat pad via a flexible joint. The dual tree stand cushion has straps with buckles for securing the dual tree stand cushion to a frame of a tree stand. Further, the dual tree stand cushion has a third channel with a web and apertures. This third channel connect the pad of the first embodiment and the seat pad of the alternate embodiment and serves to channel away water between two hunters seated on the dual tree sand cushion to provide comfort thereto.

In use, the hunters jointly take their seats, one on the original pad and the other on the seat pad of the alternate embodiment. When no longer required and once removed from the tree sand, the dual tree stand cushion of the alternate embodiment folds similarly to the preferred dual tree stand so that the dual tree stand cushion can be readily transported and/or stored.

In another alternate embodiment of the present invention, the third channel could connect two units of the preferred tree stand cushion together, securing same together via a suitable fastener.

By providing channels for water to egress without accumulation, hunters utilizing the present invention have a higher degree of comfort than they would otherwise have if water accumulated where they are seated.

In another alternate embodiment, the seat cushion comprises a seat pad portion optionally without a back portion, wherein the seat pad portion is secured to mounting rods of a boat seat via strap fasteners, such as, without limitation, hook-and-loop fasteners.

Accordingly, a feature and advantage of the present invention is its ability to provide drainage to prevent accumulation of water.

Another feature and advantage of the present invention is its ability to provide comfort to the user of a tree stand, boat seat or other outdoor seat.

Still another feature and advantage of the present invention is its ability to be compactly arranged to facilitate transport and/or storage.

Yet another feature and advantage of the present invention is its ability to adjust for the weight of the user to provide added comfort.

Yet still another feature and advantage of the present invention is that in an alternate embodiment it can accommodate a second hunter.

A further feature and advantage of the present invention is its ability to keep a hunter drier.

These and other features and advantages of the present invention will become more apparent to one skilled in the art from the following description and claims when read in light of the accompanying drawings.

BRIEF DESCRIPTION OF THE SEVERAL VIEWS OF THE DRAWINGS

The present invention will be better understood by reading the Detailed Description of the Preferred and Selected Alternate Embodiments with reference to the accompanying drawing figures, in which like reference numerals denote similar structure and refer to like elements throughout, and in which.

DETAILED DESCRIPTION OF THE PREFERRED AND SELECTED ALTERNATE EMBODIMENTS OF THE INVENTION

In describing the preferred and selected alternate embodiments of the present invention, as illustrated in FIGS. 1A-5C, specific terminology is employed for the sake of clarity. The invention, however, is not intended to be limited to the specific terminology so selected, and it is to be understood that each specific element includes all technical equivalents that operate in a similar manner to accomplish similar functions.

Referring now to FIGS. 1A-3, the present invention in a preferred embodiment is tree stand cushion 10, wherein tree stand cushion 10 comprises pad 20, flexible joint 55, lower back portion 30 and upper back portion 40, wherein lower back portion 30 is attached to pad 20 via flexible joint 55. Fillets 60 are disposed between pad 20 and lower back portion 30 and further secure and connect pad 20 to lower back portion 30, wherein fillets 60 provide longevity to flexible joint 55, by supporting same. Pad 20 comprises a shape suitable for use in a tree stand, such as, for exemplary purposes only, round, rectangular, triangular and/or generally trapezoidal.

Figure 1A:
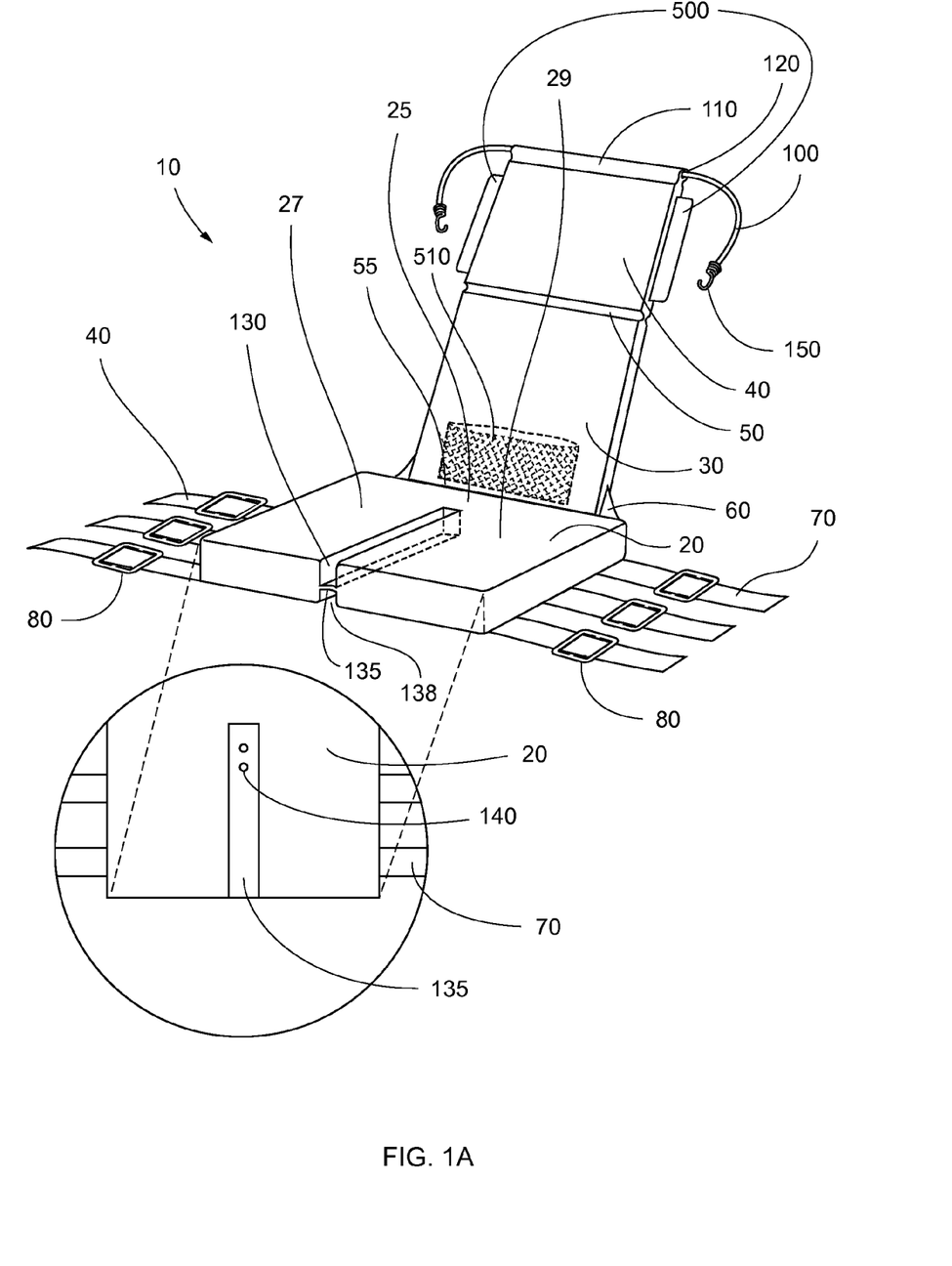
FIG. 1A is a perspective view of a preferred embodiment of the present invention, with detail breakout view.
Figure 2:
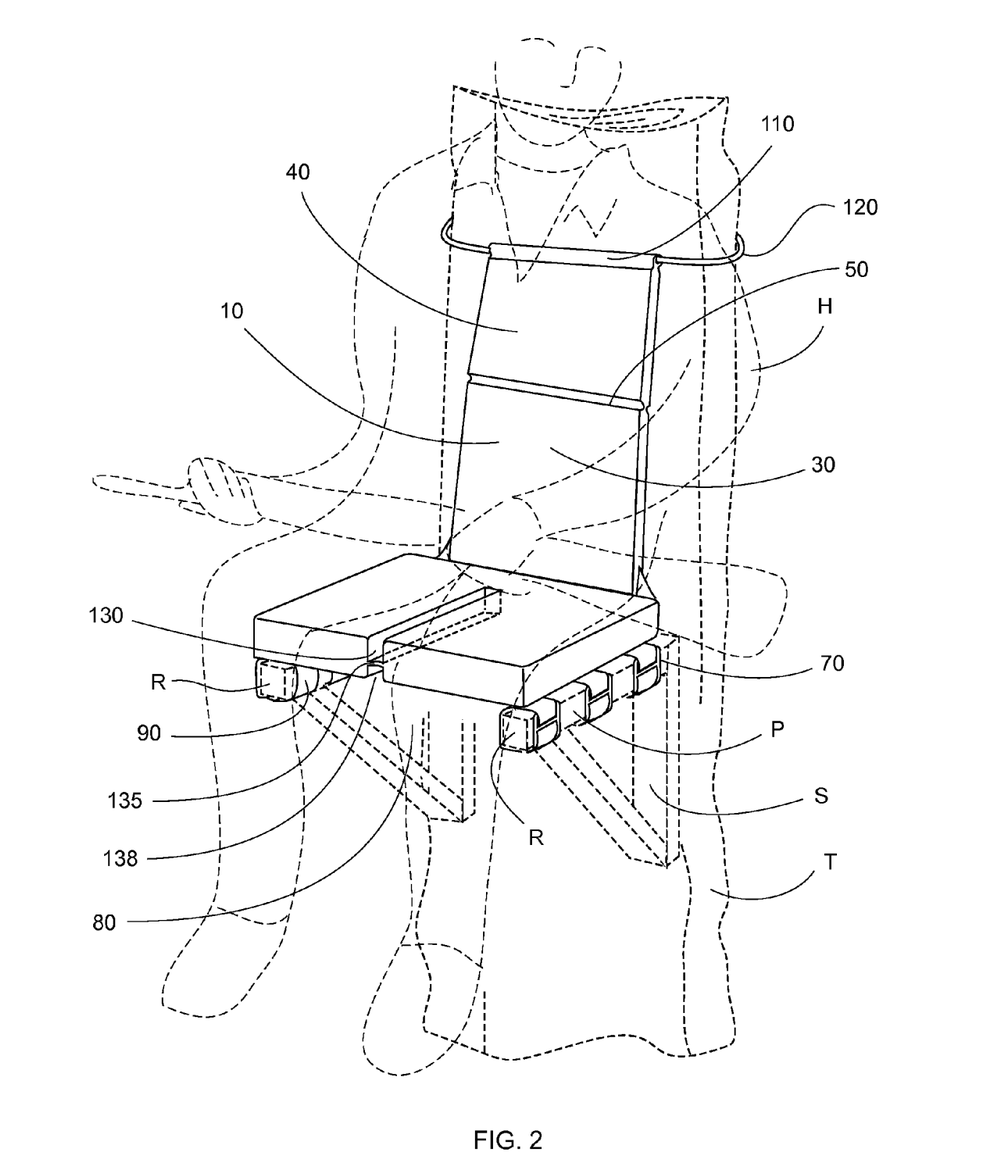
FIG. 2 is a perspective view of a preferred embodiment of the present invention, shown installed on a tree stand seat.
Figure 3:
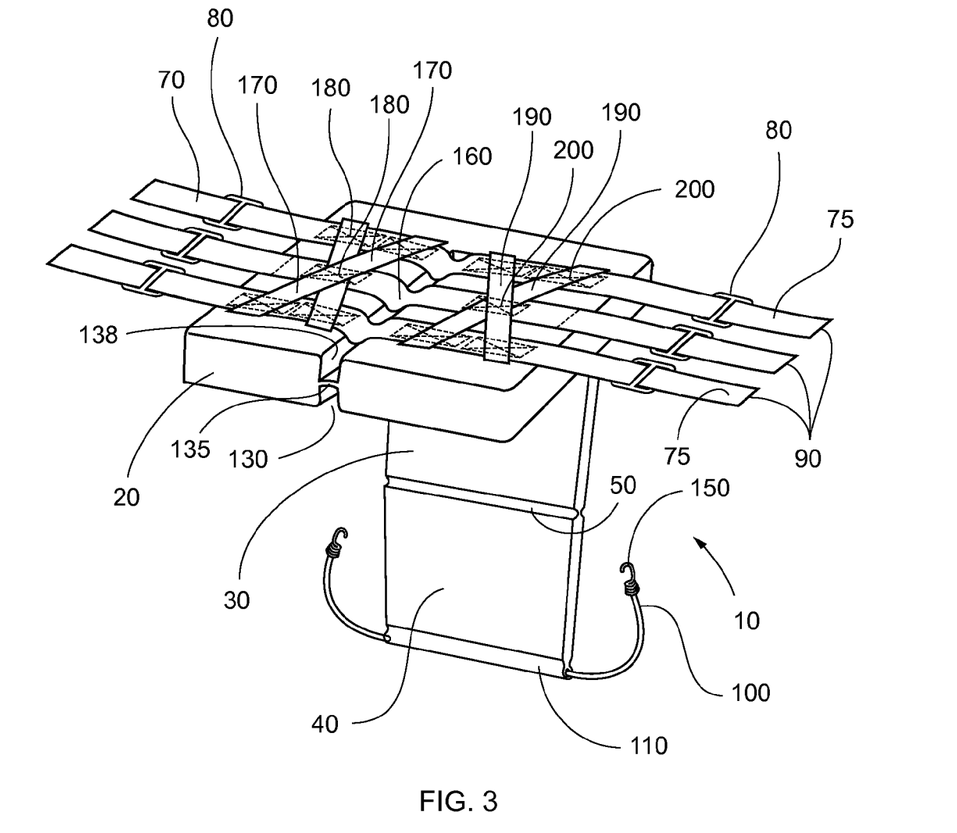
FIG. 3 is a bottom perspective view of a preferred embodiment of the present invention.

Upper back portion comprises top 110, wherein top 110 comprises throughhole 120. Bungee 100 passes through throughhole 120 to facilitate fastening of top 110 to tree T by passage of bungee around tree T, wherein hook ends 150 of bungee 100 are subsequently secured together thereby retaining top 110 against tree T.

Figure 1B:
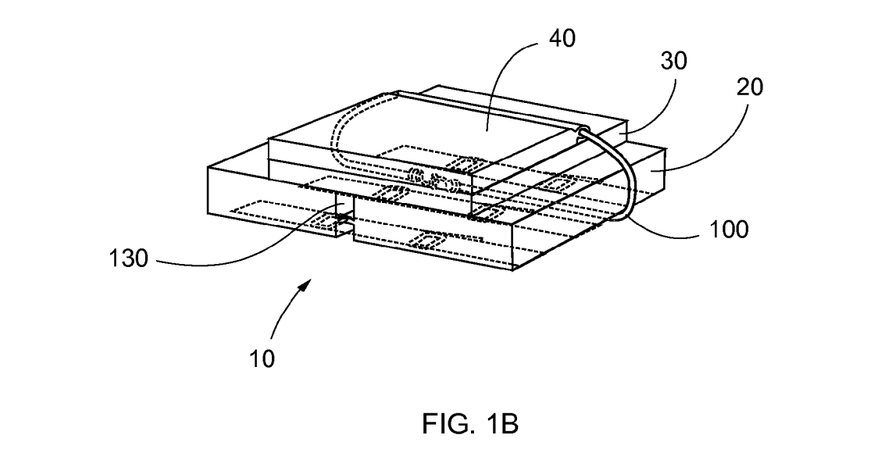
FIG. 1B is a perspective view of a preferred embodiment of the present invention, shown folded for storage or transport.

Lower back portion 30 and upper back portion 40 are hingedly joined via hinge 50, wherein hinge 50 permits folding of lower back portion 30 and upper back portion 40 through any angle, including folding of lower back portion 30 and upper back portion 40 into a single planar configuration. Pad 20 comprises channel 130, rear 25, right extension 27 and left extension 29, wherein rear 25, right extension 27 and left extension 29 are disposed coplanar as formed and when at rest. Channel 130 is disposed between right extension 27 and left extension 29 and is constrained to maximum width by web 135. Web 135 has apertures 140 disposed therethrough to permit the drainage of water that would otherwise accumulate on web 135.

Plurality of straps 90 is disposed beneath pad 20 (best shown in FIG. 3), wherein plurality of straps 90 comprises first ends 70, second ends 75 and buckles 80, wherein buckles 80 are disposed at first ends 70. Cross straps 170, 190 are secured to plurality of straps 90, wherein plurality of straps 90 and cross straps 170, 190 are secured to pad 20 via stitching 180, 200, wherein stitching 180, 200 in combination with plurality of straps 90 and web 135 restrain maximum separation of right extension 27 from left extension 29 and thus constrain maximum width of channel 130. However, stitching 180, 200 that secures centermost strap 160 is farther from channel 130 than stitching 180, 200 for the remainder of plurality of straps 90, thereby providing additional 'give' to pad 20 where it is restrained by centermost strap 160. Such 'give' is important to provide comfort to the user of tree stand cushion 10 when the user applies his/her weight thereto during taking of a seated position.

Tree stand cushion 10 is made from fabric covering of cushioning material, such as, for exemplary purposes only, foam rubber. The fabric material is preferably waterproof and scent proof. Various fabrics are suitable, but the preferred fabric is a fabric with its individual fibers scent-proofed for scent trapping or scent destroying properties.

In use, tree stand cushion 10 is transported to tree stand S and placed thereon, or alternately, tree stand cushion 10 is secured to tree stand S and tree stand S is subsequently transported to a selected location for installation on a tree, wherein tree stand S and tree stand cushion 10 are left secured to a tree when not in use. Plurality of straps 90 are passed below frame (seat) P of tree stand S, wherein first ends 70 and second ends 75 of plurality of straps 90 are secured via buckles 80 around rails R for frame P, thereby retaining tree stand cushion 10 on frame P of tree stand S. Lower back portion 30 and upper back portion 40 are disposed proximate tree T and bungee 100 is passed around tree T and secured to itself via hooks 150, thereby retaining top 110, and consequently upper back portion 40 against tree T.

Hunter H subsequently takes a seated position on tree stand cushion 10. In the event of inclement weather such as rain, water is collected within channel 130 and dispensed away from hunter H, passing through apertures 140 into lower channel 138, wherein the water can then pass forward or rearward off of tree stand S, increasing comfort to hunter H by minimizing and/or eliminating pooling of water around and under hunter H.

When use is concluded and if it is desired to remove tree stand cushion 10 from tree stand S, tree stand cushion 10 may be removed from tree stand S and folded for storage, wherein upper back portion 40 is folded flat against and coplanar with lower back portion 30 via hinge 50, and wherein combined upper and lower back portions 40, 30 are subsequently folded flat against and coplanar with pad 20 via flexible joint 55. In folded condition, pad 20, lower back portion 30 and upper back portion 40 form a compact 'z' shape.

Once pad 20, lower back portion 30 and upper back portion 40 are folded into a coplanar form, bungee 100 is secured therearound via hooks 150. In such fashion, tree stand cushion 10 is readily transported and/or stored.

If tree stand cushion 10 is not to be removed and stored, it remains secured to tree stand S for later use.

Figure 4:
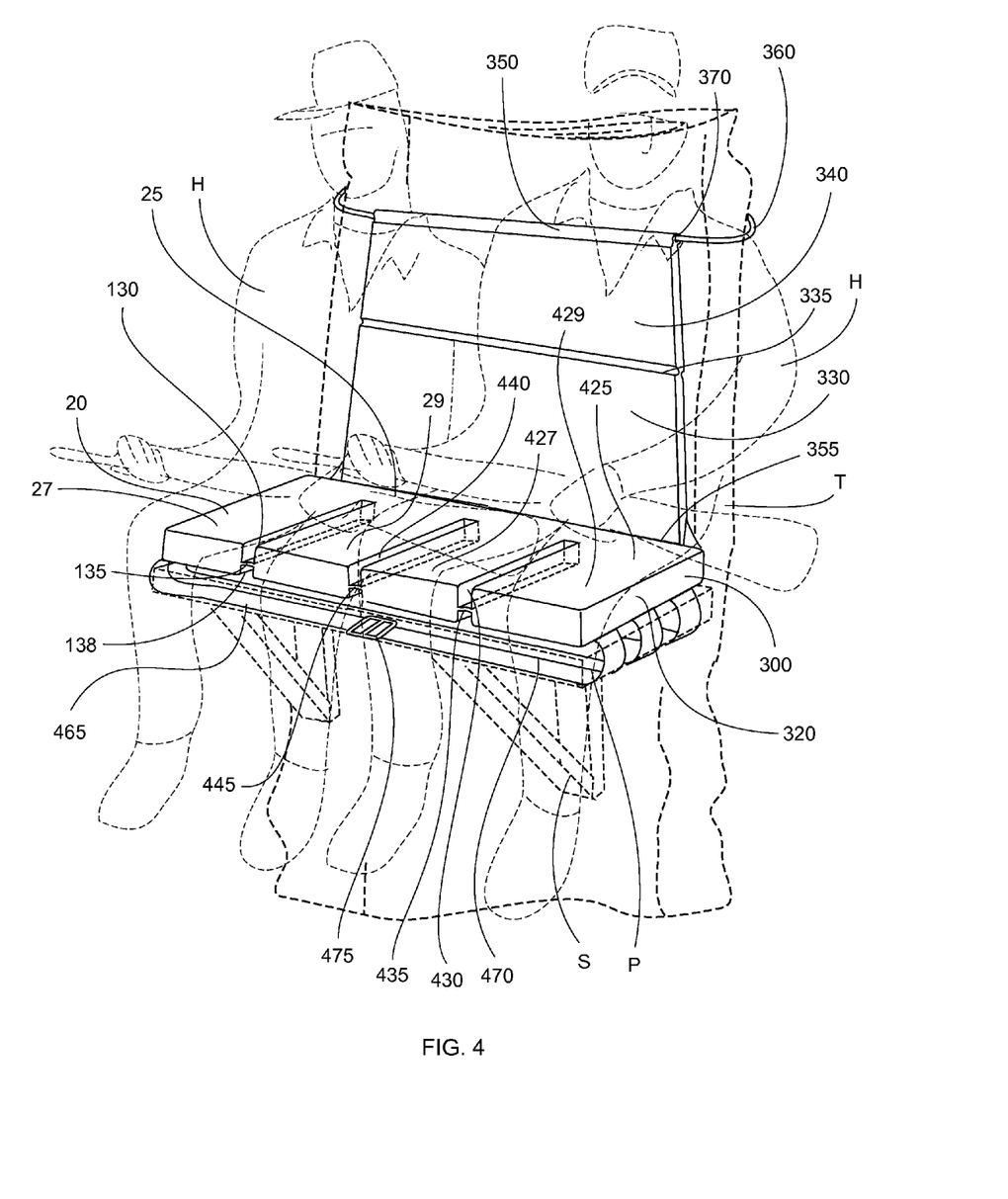
FIG. 4 is a perspective view of an alternate embodiment of the present invention, shown installed on a tree stand.

Referring now more specifically to FIG. 4, illustrated therein is an alternate embodiment of tree stand cushion 10, wherein the alternate embodiment of FIG. 4 is substantially equivalent in form and function to that of the preferred embodiment detailed and illustrated in FIGS. 1A-3 except as hereinafter specifically referenced. Specifically, the embodiment of FIG. 4 comprises dual tree stand seat cushion 300, wherein dual tree stand seat cushion 300 comprises seat pad 320, and wherein seat pad 320 comprises rear 25, right extension 27, left extension 29, second rear portion 425, second right extension 427 and second left extension 429. Right extension 27 and left extension 29 are separated by channel 130 as described hereinbefore. Second right extension 427 and second left extension 429 are separated by second channel 430, wherein second channel 430 comprises web 435 therewithin. Web 435 comprises apertures 437 (not shown), wherein apertures 437 permit the passage of water therethrough in the same fashion as described for apertures 140 hereinabove.

Dual tree stand seat cushion 300 further comprises lower back section 330, hinge 335 and upper back section 340, wherein lower back section 330 and upper back section 340 are joined via hinge 335. Upper back section 340 comprises bungee 360 and top 350, wherein top 350 comprises throughhole 370, and wherein bungee 360 passes through top 350 via throughhole 370 and continues around tree T, thereby securing dual tree stand cushion 300 to tree T.

Lower back section is hingedly joined to seat pad 320 via flexible joint 355. Dual tree stand cushion 300 further comprises straps 465, 470, wherein straps 470 further comprise buckles 475 for securing dual tree stand cushion 300 to frame P of tree stand S. Dual tree stand cushion 300 further comprises third channel 440, wherein third channel 440 comprises third web 445, and wherein third web 445 comprises apertures 447 (not shown). Thus, third channel 440 serves to channel water between hunters H away to provide comfort to hunters H.

In use, hunters H jointly take their seat on seat pad 320, wherein seat pad 320 is adequately wide to comfortably provide seating for two hunters H. Dual tree stand cushion 300 folds similarly to dual tree stand 10 so that dual tree stand cushion 300 can be readily transported and/or stored.

In another alternate embodiment of the present invention, third channel 440 could connect two units of tree stand cushion 10 together, wherein the two units are secured together via a suitable fastener such as is known in the art.

Figure 5A:
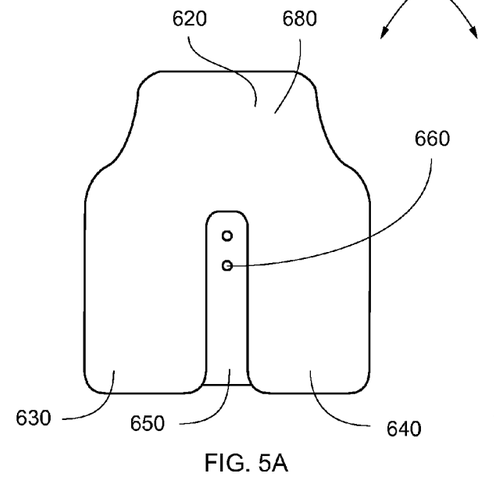
FIG. 5A is a top view of a boat seat cushion accordingly to an alternate embodiment of the present invention.
Figure 5B:
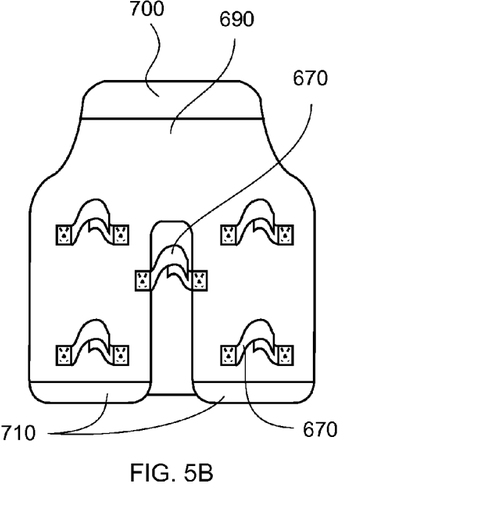
FIG. 5B is a bottom view of a boat seat cushion according to an alternate embodiment of the present invention.
Figure 5C:
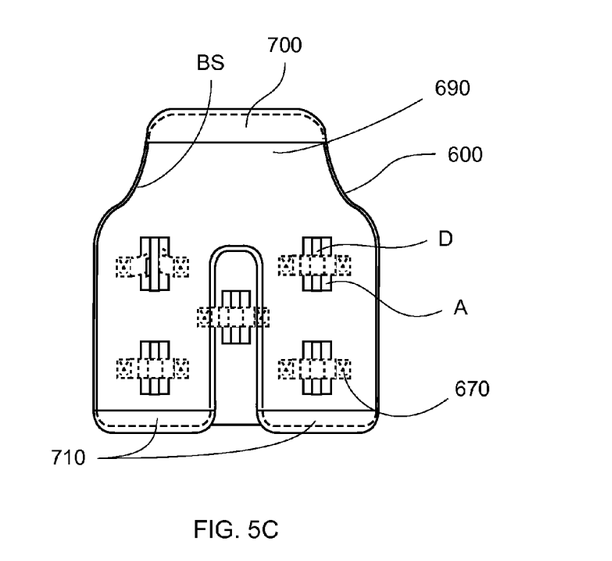
FIG. 5C is a bottom view of a boat seat, showing the boat seat cushion according to an alternate embodiment of the present invention installed on the boat seat.

Referring now more specifically to FIGS. 5A-5C, illustrated therein is an alternate embodiment of tree stand cushion 10, wherein the alternate embodiment of FIGS. 5A-5C is substantially equivalent in form and function to that of the preferred embodiment detailed and illustrated in FIGS. 1A-3 except as hereinafter specifically referenced. Specifically, the embodiment of FIGS. 5A-5C comprises boat cushion 600 having top 680 and bottom 690, wherein boat cushion 600 comprises rear portion 620, right portion 630 and left portion 640 and web 650, wherein web 650 is disposed between right portion 630 and left portion 640, and wherein web 650 comprises apertures 660 therethrough. Bottom 690 comprises fasteners 670, wherein fasteners 670 comprise, for exemplary purposes only, hook-and-loop fasteners. It will be recognized by those skilled in the art that fasteners 670 could comprise any suitable fastener as known for securing a seat cushion to a seat.

Bottom 690 further comprises rear pocket 700 and front pockets 710, wherein pockets 700, 710 are dimensioned to receive boat seat BS, thereby retaining boat cushion 600 on boat seat BS. Further, fasteners 670 pass though apertures A in boat seat BS, and secure around rods D of boat seat BS.

Apertures 660 in web 650 allow water to flow through web 650, as described hereinabove for apertures 140 of the preferred embodiment, thereby keeping boat cushion 600 comfortable for the user thereof.

The foregoing description and drawings comprise illustrative embodiments of the present invention. Having thus described exemplary embodiments of the present invention, it should be noted by those skilled in the art that the within disclosures are exemplary only, and that various other alternatives, adaptations, and modifications may be made within the scope of the present invention. Merely listing or numbering the steps of a method in a certain order does not constitute any limitation on the order of the steps of that method. Many modifications and other embodiments of the invention will come to mind to one skilled in the art to which this invention pertains having the benefit of the teachings presented in the foregoing descriptions and the associated drawings. Although specific terms may be employed herein, they are used in a generic and descriptive sense only and not for purposes of limitation. Accordingly, the present invention is not limited to the specific embodiments illustrated herein, but is limited only by the following claims.

What is claimed is:

1. A seat cushion comprising:
  a pad having a left member, a right member and a channel centrally disposed between said left member and said right member;
  a rear member, wherein said left member and said right member extend perpendicular to, and in the same plane as, said rear member;
  a first pair of cross straps secured to said left member and a second pair of cross straps secured to said right member; and
  at least one strap restrained by said first pair of cross straps and said second pair of cross straps.

2. The seat cushion of claim 1, wherein said channel comprises a web disposed therewithin.

3. The seat cushion of claim 2, further comprising at least one aperture, wherein said at least one aperture is disposed on and through said web.

4. The seat cushion of claim 3, further comprising:
a second pad having a second left member and a second right member and a second channel centrally disposed between said second left member and said second right member.

5. The seat cushion of claim 4, wherein a second web is disposed within said second channel, and wherein said second web comprises at least one aperture therethrough.

6. The seat cushion of claim 5, further comprising a second rear member, wherein said second left member and second right member extend perpendicular to, and in the same plane as, said second rear member, and wherein said second channel separates said second left member and said second right member.

7. The seat cushion of claim 6, further comprising a third web, wherein said third web is disposed in a third channel between said pad and said second pad.

8. The seat cushion of claim 7, wherein said third channel is coplanar with said pad and said second pad.

9. The seat cushion of claim 7, wherein said third channel has at least one aperture disposed therethrough.

10. The seat cushion of claim 1, further comprising a rear section.

11. The seat cushion of claim 10, further comprising a flexible joint, wherein said rear section is hingedly attached to said rear member via said flexible joint.

12. The seat cushion of claim 10, wherein said rear section comprises a lower back portion, an upper back portion and a hinge, and wherein said hinge is disposed between said lower back portion and said upper back portion.

13. The seat cushion of claim 12, further comprising a fastening member, wherein said fastening member is disposed at a top of said upper back portion, and wherein said top comprises a throughhole, and wherein said fastening member passes through said top via said throughhole, whereby said fastening member secures said top to a tree.

14. The seat cushion of claim 12, wherein said upper back portion and said lower back portion fold coplanar with said left member, said right member and said rear member.

15. The seat cushion of claim 1, wherein the at least one strap comprises at least two straps selected from the group consisting of an inner strap, a middle strap and an outer strap.

16. The seat cushion of claim 1, wherein said left member, said right member and said rear member each comprise a pocket, and wherein said pocket receives a frame portion of a seat, whereby said seat cushion is secured to said seat.

17. A seat cushion comprising:
a pad having a left member, a right member and a channel disposed between said left member and said right member;
a rear member, wherein said left member and said right member extend perpendicular to, and in the same plane as, said rear member;
a first pair of cross straps secured to said left member and a second pair of cross straps secured to said right member; and
an inner strap, a middle strap and an outer strap restrained by said first pair of cross straps and said second pair of cross straps; wherein said middle strap is less restrained by said first pair of cross straps and said second pair of cross straps than said inner strap and said outer strap, and wherein said middle strap permits deformation of said left and right members under weight.

18. A method of cushioning a seat, said method comprising the steps of:
placing a cushion having a pad comprising a left member, a right member and a channel centrally disposed between said left member and said right member on a seat frame, wherein said channel comprises a dimension-constraining web with at least one drainage aperture therewithin, wherein a first pair of cross straps is secured to said left member and a second pair of cross straps is secured to said right member, and wherein at least one strap is restrained by said first pair of cross straps and said second pair of cross straps; and
securing said cushion to said seat frame via a fastener.

19. The method of claim 18, further comprising the step of:
securing said cushion to the seat frame via said at least one strap.

20. An apparatus comprising:
a first cushion having a first center channel with a first dimension-constraining web therewithin, a first pair of cross straps secured to a left member of said first cushion, and a second pair of cross straps secured to a right member of said first cushion;
a second cushion having a second center channel with a second dimension-constraining web therewithin, a third pair of cross straps secured to a left member of said second cushion, and a fourth pair of cross straps secured to a right member of said second cushion;
at least one strap restrained by said first pair of cross straps, said second pair of cross straps, said third pair of cross straps, and said fourth pair of cross straps; and
a third channel connecting said first cushion and said second cushion, wherein each of said channels comprises at least one drainage aperture therewithin.

* * * * *